United States Patent
Sickles et al.

(10) Patent No.: US 9,992,822 B2
(45) Date of Patent: Jun. 5, 2018

(54) METHOD OF MITIGATING STRATIFICATION OF TEMPERATURE WITHIN THE INTERIOR OF A MOBILE HEATED CABINET, AND MOBILE HEATED CABINET USING SAME

(75) Inventors: Willard Sickles, Dalton, PA (US); Jeffrey C. Olson, Dallas, PA (US); James Kilgallon, Forty Fort, PA (US)

(73) Assignee: InterMetro Industries Corporation, Wilkes-Barre, PA (US)

( * ) Notice: Subject to any disclaimer, the term of this patent is extended or adjusted under 35 U.S.C. 154(b) by 1012 days.

(21) Appl. No.: 13/367,726

(22) Filed: Feb. 7, 2012

(65) Prior Publication Data

US 2012/0199568 A1 Aug. 9, 2012

Related U.S. Application Data

(60) Provisional application No. 61/440,514, filed on Feb. 8, 2011.

(51) Int. Cl.
*A47J 39/00* (2006.01)
*F25D 17/06* (2006.01)
*H05B 1/02* (2006.01)

(52) U.S. Cl.
CPC .......... *H05B 1/0252* (2013.01); *A47J 39/003* (2013.01)

(58) Field of Classification Search
USPC ....... 219/201, 406, 400, 385, 386, 394, 395, 219/399, 428; 312/236; 99/314–483
See application file for complete search history.

(56) References Cited

U.S. PATENT DOCUMENTS

| | | | | |
|---|---|---|---|---|
| 1,037,771 A | * | 9/1912 | Hughes | 219/386 |
| 3,042,384 A | * | 7/1962 | Bauman | 165/42 |
| 3,624,346 A | * | 11/1971 | Guth | 219/201 |
| 3,895,215 A | * | 7/1975 | Gordon | 219/400 |
| 3,924,100 A | * | 12/1975 | MacK et al. | 219/386 |
| 4,030,476 A | * | 6/1977 | Hock | 126/246 |
| 4,093,041 A | * | 6/1978 | Davis et al. | 186/45 |
| 4,138,504 A | * | 2/1979 | MacK et al. | 426/520 |
| 4,167,983 A | * | 9/1979 | Seider et al. | 180/19.1 |
| 4,285,391 A | * | 8/1981 | Bourner | 165/61 |
| 4,776,317 A | | 10/1988 | Pinnow et al. | |
| 5,276,309 A | | 1/1994 | Hasse et al. | |
| 5,319,937 A | * | 6/1994 | Fritsch et al. | 62/3.62 |
| 5,749,234 A | * | 5/1998 | Takano | 62/125 |
| 5,771,959 A | * | 6/1998 | Westbrooks et al. | 165/11.1 |

(Continued)

FOREIGN PATENT DOCUMENTS

JP 10-234590 A 9/1998
WO 2009/143342 A2 11/2009

*Primary Examiner* — Dana Ross
*Assistant Examiner* — Lawrence Samuels
(74) *Attorney, Agent, or Firm* — Harness, Dickey & Pierce, P.L.C.

(57) ABSTRACT

A mobile heated cabinet and method of mitigating stratification of temperature within the interior of the mobile heated cabinet are disclosed, wherein the mobile heated cabinet can be used to both (a) store food at a stationary location and (b) store and transport food when moved from the stationary location. The disclosed mobile heated cabinet and method mitigate stratification of temperature by providing a heating device, an air circulating device, an external power source, and a self-contained power source.

7 Claims, 5 Drawing Sheets

(56) References Cited

U.S. PATENT DOCUMENTS

| | | | |
|---|---|---|---|
| 6,120,819 A | 9/2000 | Violi et al. | |
| 6,294,762 B1* | 9/2001 | Faries et al. | 219/400 |
| 6,344,630 B1* | 2/2002 | Jarvis et al. | 219/386 |
| 6,384,380 B1* | 5/2002 | Faries et al. | 219/385 |
| 6,539,846 B2* | 4/2003 | Citterio et al. | 99/468 |
| 6,644,178 B2* | 11/2003 | Clark | 99/482 |
| 6,684,657 B1* | 2/2004 | Dougherty | 62/237 |
| 6,693,260 B1* | 2/2004 | Rodrigues | 219/385 |
| 7,205,507 B2* | 4/2007 | LoMaglio et al. | 219/400 |
| 7,227,102 B2 | 6/2007 | Shei | |
| 7,276,675 B2* | 10/2007 | Faries et al. | 219/413 |
| 7,971,443 B2* | 7/2011 | Nishita et al. | 62/159 |
| 8,067,715 B2* | 11/2011 | Peterson et al. | 219/386 |
| 2001/0042743 A1* | 11/2001 | Faries et al. | 219/400 |
| 2002/0096509 A1* | 7/2002 | Von Mosshaim | 219/452.11 |
| 2003/0005830 A1* | 1/2003 | Citterio et al. | 99/468 |
| 2004/0035553 A1* | 2/2004 | Bosher et al. | 165/48.1 |
| 2004/0074399 A1* | 4/2004 | Zhou et al. | 99/448 |
| 2005/0028543 A1* | 2/2005 | Whitehead et al. | 62/237 |
| 2006/0043087 A1 | 3/2006 | Gagas et al. | |
| 2006/0049172 A1 | 3/2006 | Gagas et al. | |
| 2006/0113294 A1* | 6/2006 | LoMaglio et al. | 219/400 |
| 2006/0191901 A1* | 8/2006 | Taylor et al. | 219/521 |
| 2007/0193999 A1* | 8/2007 | Peterson et al. | 219/386 |
| 2008/0135564 A1* | 6/2008 | Romero | 220/592.2 |
| 2009/0170418 A1* | 7/2009 | Codling | 454/66 |
| 2009/0193826 A1* | 8/2009 | Yasugi et al. | 62/159 |
| 2009/0212047 A1* | 8/2009 | Harman et al. | 220/1.5 |
| 2010/0186605 A1* | 7/2010 | Lichte et al. | 99/470 |

* cited by examiner

METHOD OF MITIGATING STRATIFICATION OF TEMPERATURE WITHIN THE INTERIOR OF A MOBILE HEATED CABINET, AND MOBILE HEATED CABINET USING SAME

BACKGROUND OF THE INVENTION

Field of the Invention

The present invention relates generally to a method of mitigating stratification of temperature within the interior of a mobile heated cabinet. It also relates to such a mobile heated cabinet that mitigates stratification of temperatures.

Description of the Related Art

Heated cabinets for heating, holding, and/or proofing food are commonly used in the food service industry, for example in hotels, school cafeterias, restaurants, bakeries, and the like. These heated cabinets can control the temperature within the cabinet, and may be used to cook food, and to keep prepared food at certain temperatures. In many of these applications food may be placed in the cabinet at a stationary location such as a kitchen, and the loaded cabinet may then be transported over large distances during which it may not be connected to an external power source.

Electric heating elements are provided in heated cabinets to warm food stored therein. As seen in U.S. Pat. Nos. 4,776,317 and 5,276,309, fans can be installed near an electric heating element. The fans are provided to force air to move over the electric heating element in order to heat the air and guide the heated air into a food storage area of the heated cabinet. However, such fans often do not uniformly distribute the heated air throughout the heated cabinets and changes in distribution of the generated heat can occur when the cabinet is moved from a stationary location where it is connected to an external source of electrical power. Thus, stratification of temperatures of the interior of the heated cabinets can occur.

Normally, heated cabinets must be plugged into a power source to provide energy to both fans and electric heating elements. When a heated cabinet is to be moved from one location to another, however, the power supply is disconnected and heating from the electric heating elements and air circulation from the fan are discontinued. Because of large power requirements of electric heating elements and certain other electrical components of heated cabinets, it has been thought to be impractical to provide power to such cabinets during transportation from an alternative power source. As a result, heat loss and temperature stratification occurs, which may result in food safety issues as well as quality and consistency issues.

One device known in the art is described in JP 10-234590, which is directed to a mobile warming device that generates heat from two separate heating sources in order to provide heat to a food storage area of a heated cabinet during transportation from one location to another. The first source is an electric heating source that is disposed inside the food storage area of the mobile cabinet. The second heating source is a heat accumulator having an insulation layer that surrounds another electric heating source embedded in a thermal storage medium. In between the insulation layer and the embedded electric heating source is a channel that allows for the flow of air. The heat accumulator uses a fan to guide air around the embedded electric heating source, thus, heating the air. The fan can then blow the heated air into the food storage area.

As disclosed in JP 10-234590, when the mobile warming device is connected to an external power supply, the first heating source heats the food inside the food storage area to about 80° C., and the embedded electric heating source heats the thermal storage medium to temperatures of about 300 to 400° C. When external power is unavailable, both the first heating source and the embedded electric heating source are turned off. In order to provide heat, a rechargeable battery is connected to a controller and the fan of the heat accumulator. When external power is unavailable, the fan is turned on to move previously heated air, which is guided from the thermal storage medium.

Other prior art devices are known but these are not understood to power a fan associated with the interior of a heated cabinet when it is disconnected from an external power source.

In heated cabinets such as discussed above, fans are provided to force heated air into the food storage areas of heated cabinets. However, such heated cabinets may not prevent temperature stratification within the food storage area when the cabinets are connected to an external power supply. Temperature stratification can also occur when the power supply is disconnected because the fan is provided near a heating source and only heated air is forced into a food storage area. In such heated cabinets, fans are not provided to circulate air within the food storage area in order to provide a uniform temperature throughout the food storage area whether an external power supply is available or not.

SUMMARY OF THE INVENTION

The present invention addresses the foregoing by circulating heated air in a mobile heated cabinet whether or not an air circulating device is connected to or disconnected from an external power source. Such arrangement allows the circulating device to substantially continuously circulate heated air inside the cabinet.

In one embodiment, the invention provides a method of mitigating stratification of temperature within the interior of a mobile heated cabinet used to both (a) store food at a stationary location and (b) store and transport food when moved from the stationary location. The method is performed during both the storing function and the storing and transporting function, and includes the steps of providing an electric-powered heating device in the interior of the cabinet, providing an electric-powered air circulating device in the interior of the cabinet, providing an external source of electrical power for the heating device and the air circulating device for use when the cabinet is performing the storing function at a stationary location, and providing a self-contained source of electrical power associated with the cabinet for the air circulating device for use when the cabinet is performing the storing and transporting function. Accordingly, the method powers the heating device and air circulating device with the external power source when the cabinet is in the stationary location, to thereby mitigate stratification of temperatures within the cabinet by mitigating accumulation of heated air at the top of the interior of the cabinet, and automatically powers the air circulating device with the self-contained power source when the cabinet is disconnected from the external power source during performance of the storing and transporting function, to thereby also mitigate stratification of temperatures within the cabinet by mitigating accumulation of heated air at the top of the interior of the cabinet when performing the storing and transporting function.

In another embodiment, the invention provides a method of mitigating stratification of temperature within the interior of a mobile heated cabinet used to both (a) store food at a stationary location and (b) store and transport food when moved from the stationary location, the method being performed during performance of both the storing function and the storing and transporting function and including the steps of providing an electric-powered heating device associated with the interior of the cabinet, providing an electric-powered air circulating device in the interior of the cabinet, providing a plurality of temperature sensors in the interior of the cabinet, providing an external source of electrical power for the heating device, the air circulating device, and the temperature sensor for use when the cabinet is performing the storing function at a stationary location, providing a self-contained source of electrical power associated with the cabinet for the air circulating device and the temperature sensor for use when the cabinet is performing the storing and transporting function, powering the heating device and air circulating device with the external power source when the cabinet is in the stationary location, to thereby mitigate stratification of temperatures within the cabinet by mitigating accumulation of heated air at the top of the interior of the cabinet, measuring a temperature differential with the temperature sensors within the interior of the cabinet, and automatically powering the air circulating device with the self-contained power source when the cabinet is disconnected from the external power source during performance of the storing and transporting function and when a minimum temperature is measured by said step of measuring temperature, to thereby also mitigate stratification of temperatures within the cabinet by mitigating accumulation of heated air at the top of the interior of the cabinet when performing the storing and transporting function.

In still another embodiment, the invention provides a mobile heated cabinet for mitigating stratification of temperature within the interior of said mobile heated cabinet used to both (a) store food at a stationary location and (b) store and transport food when moved from the stationary location, said mobile heated cabinet comprising an electric-powered heating device disposed in the interior of the cabinet, which heats the interior thereof, an electric-powered air circulating device disposed in the interior of the cabinet, which circulates air in the interior of the cabinet, and a self-contained source of electrical power which powers the air circulating device when the cabinet is performing the storing and transporting function, wherein an external source of electrical power powers the electric-powered heating device and the air circulating device when the cabinet is performing the storing function at a stationary location, thereby mitigating stratification of temperatures within the cabinet by mitigating accumulation of heated air at the top of the interior of the cabinet, and wherein the self-contained source of electrical power powers the air circulating device when the cabinet is disconnected from the external power source during performance of the storing and transporting function, thereby also mitigating stratification of temperatures within the cabinet by mitigating accumulation of heated air at the top of the interior of the cabinet when performing the storing and transporting function.

The above-discussed method and mobile heated cabinet mitigate stratification of temperatures within the cabinet by circulating heated air in the cabinet whether or not the mobile heated cabinet is connected to or disconnected from an external power source.

Additional objects, advantages, and features of the invention will become apparent to those skilled in the art upon examination of the following detailed description of preferred embodiments taken in conjunction with the accompanying drawings.

DESCRIPTION OF THE EMBODIMENTS

Figure 1:
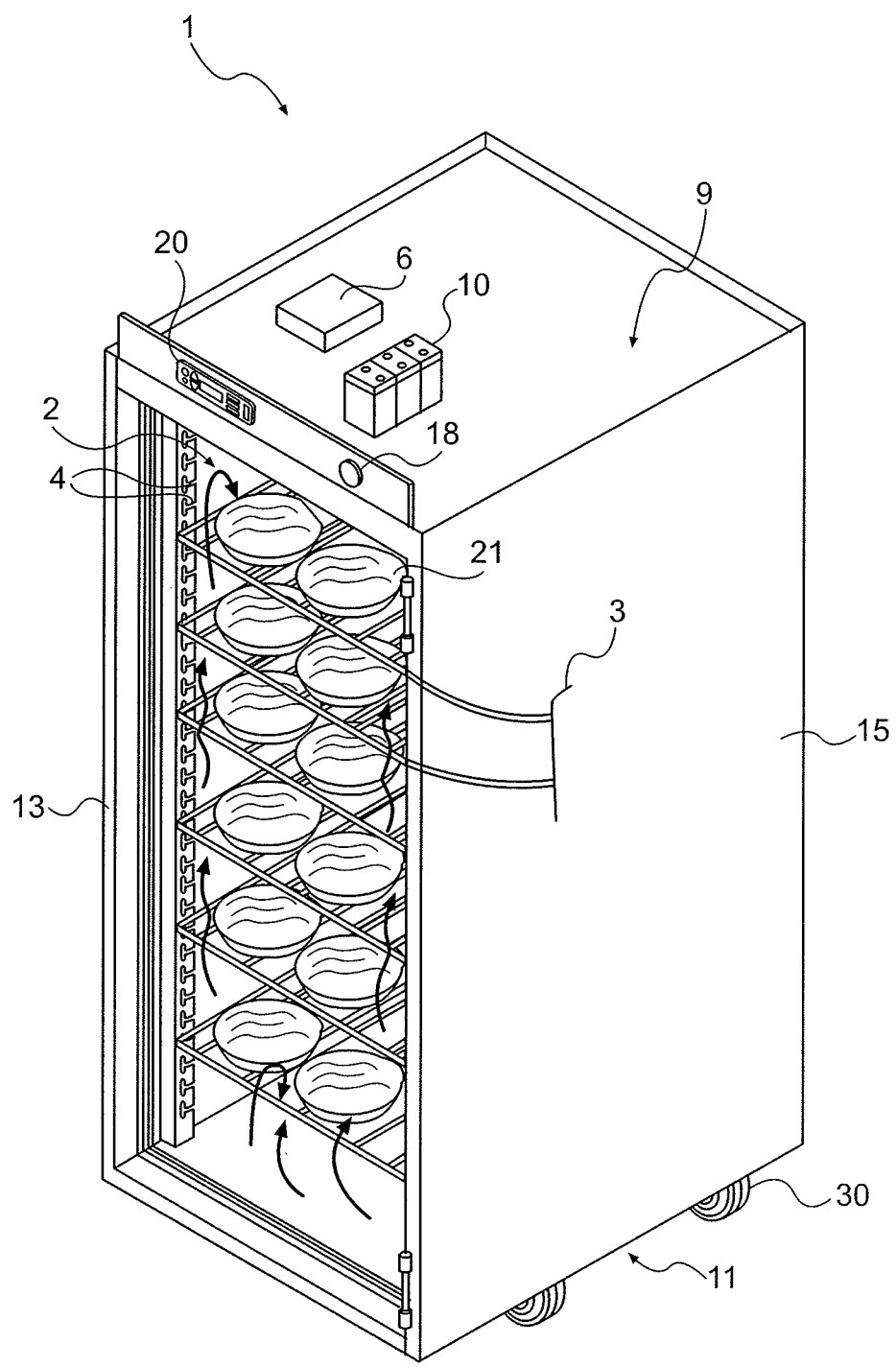
FIG. 1 is a front perspective view of an embodiment of a mobile heated cabinet of the present invention with a front door and top cover panel of the cabinet removed.
Figure 2A:
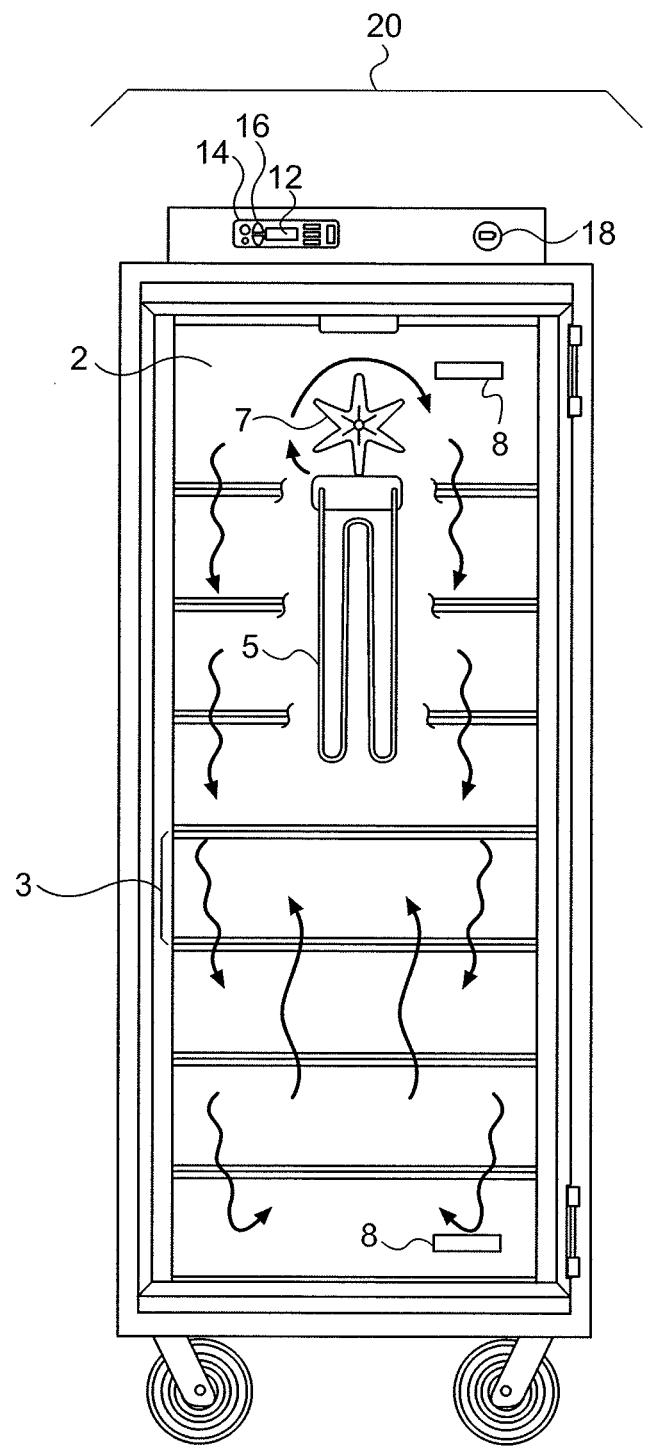
FIG. 2A is a front view of the mobile heated cabinet of FIG. 1 with the front door of the cabinet removed.
Figure 2B:
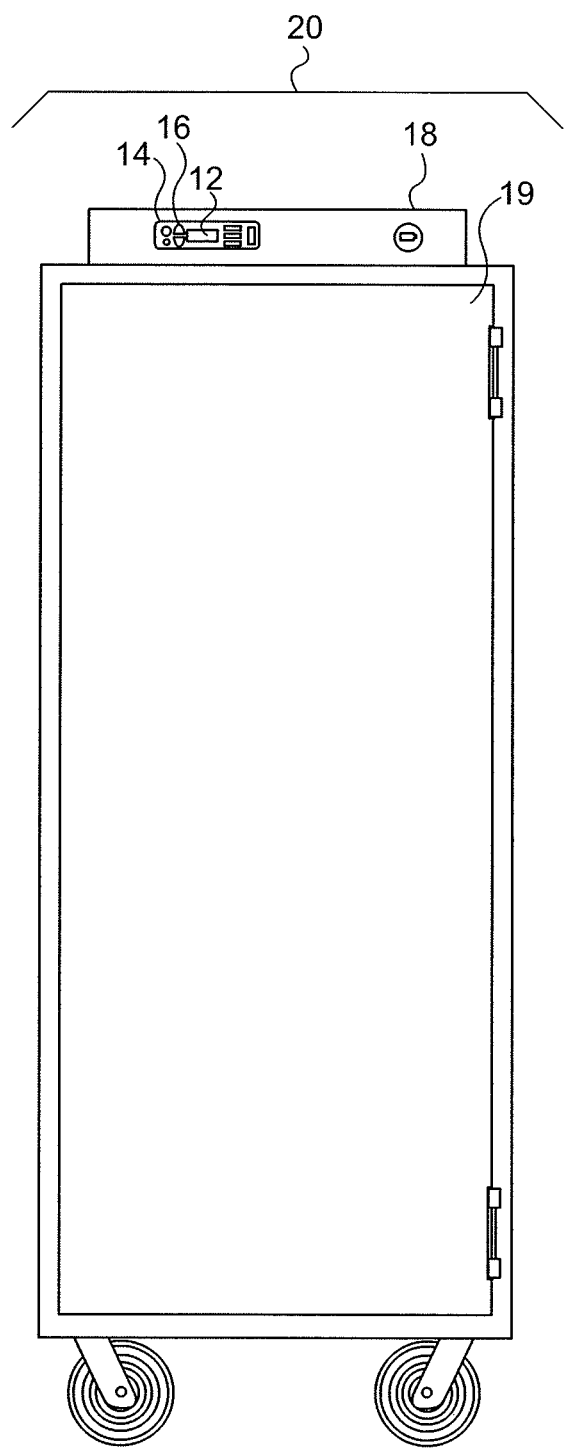
FIG. 2B is a front view of the mobile heated cabinet of FIG. 1 with the front door mounted and in the closed position.
Figure 3:
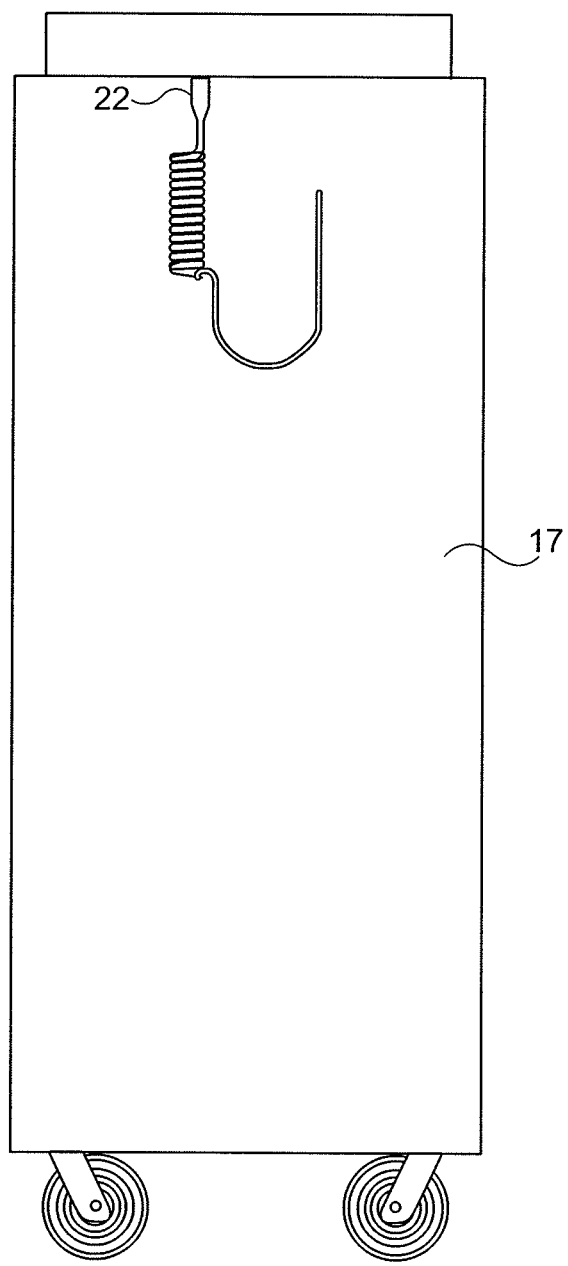
FIG. 3 is a rear view of the mobile heated cabinet of FIG. 1.

FIGS. 1 to 3 illustrate one embodiment of a mobile heated cabinet 1 of the present invention, which defines a food storage area 2 having a plurality of tray receiving portions 4 for removably receiving a plurality of trays 3. As shown in FIGS. 1 and 2A, the mobile heated cabinet 1 may be mounted on casters 30 to provide easy transport and can have a varying number of trays 3 in the plurality of tray receiving portions 4. It should be understood that the number of trays 3 can be increased or decreased depending on the amount of food 21 needed to be heated. Additionally, it should be noted that the mobile heated cabinet 1 may include one or more food storage areas 2. The one or more food storage areas 2 may be arranged one above the other and/or arranged side by side.

More particularly, the food storage area 2 of the mobile heated cabinet 1 is defined by a top wall 9, bottom wall 11, side walls 13 and 15, and a rear wall 17. The cabinet 1 also has a door 19 that can be opened to allow access to the food storage area 2 and to allow the sliding of each tray 3 either into or out of a respective tray receiving portion 4. The top wall 9, bottom wall 11, side walls 13 and 15, and rear wall 17 are desirably insulated to prevent heat loss. The door 19 may also be insulated to prevent heat loss. A control cover (not shown) covers the top wall 9 of the mobile cabinet 1, to conceal various electrical components of the cabinet 1 that may be mounted on the top wall 9. The various electrical components are not limited to being mounted on the top wall, but may, for example, be mounted on the back wall 17, side walls 13 and 15, or under the bottom wall 11.

In one embodiment, each tray 3 is generally rectangular, and may be disposed in a tray receiving portion 4 in the mobile heated cabinet 1. As seen in FIG. 2A, an electric heating element 5 is disposed on the interior of the back wall 17 in the food storage area 2. This element 5 may be a resistive heating element, an infrared heat source, or other electrically powered heating device. The electric heating element 5 may extend the whole length of the food storage area 2 or a portion of the food storage area 2. Alternatively, a plurality of electric heating elements may be disposed in the food storage area 2 of the mobile cabinet 1. Of course, the heating element 5 may also be disposed on any interior wall of the food storage area 2 and/or the interior side of the door 19 of the cabinet 1. The heating element 5 constitutes a primary heating source for heating the food storage area 2 and its food content, and may preheat the food storage area 2, cook the food in the food storage area 2, and/or maintain the temperature for long term storage of the food. The electric heating element 5 is electrically connected to a controller 6 and may be connected to an external power source through a power cord 22 (FIG. 3), or other connection, when the cabinet is at a substantially stationary location.

The cabinet 1 also includes a least one air circulating device to circulate air within the food storage area 2. As seen in FIG. 2A, the air circulating device may be a fan 7, which is disposed on the rear wall 17. Alternatively, there may be a plurality of air circulating devices, such as fans disposed in the food storage area 2 of the mobile heated cabinet 1. Again, of course, the one or more air circulating devices may also be disposed on any interior wall and/or the interior-side of the door 19 of the cabinet 1. The use of an air circulating device, such as the fan 7, is used to minimize temperature stratification in the food storage area 2 of the mobile heated cabinet 1. Since hot air rises, without air circulation the air at the top of the food storage area 2 would become hotter than the air at the bottom of the food storage area 2. However, as shown by the arrows in FIGS. 1 and 2A, the fan 7 circulates the air inside of the food storage area 2 in order to prevent air from stagnating and stratifying inside the area 2.

The air circulating device is also electrically connected to the external power source through the power cord 22 (or other connection) and the controller 6. The air circulating device is also electrically connected to a self-contained source of electrical power, such as a rechargeable battery 10, through the controller 6.

One or more temperature sensors 8 may be disposed at various locations within the food storage area 2 of the mobile heated cabinet 1. The one or more temperatures sensors 8 may provide temperature readings at various locations within the food storage area. The sensors 8 are electrically connected to the external power source and the rechargeable battery 10 through the controller 6. Signals from the sensors 8 are sent through the controller 6 to a display 12 on a control panel 20. The signals can then be displayed as a temperature reading on the display 12, which allows an operator to monitor the performance of the heated cabinet.

The control panel 20 allows an operator to operate the mobile heated cabinet 1 and monitor its performance, and comprises at least a power switch 14, the display 12, a temperature control section 16, and a battery indicator 18. The power switch 14 allows an operator to turn on and turn off the mobile heated device 1. The display 12 can display temperature values inside the cabinet 1 detected by the one or more temperature sensors 8. The temperature control section 16 allows an operator to increase or decrease the set-point temperatures of the electric heating element 5 when the mobile heated cabinet 1 is plugged in to the external power source. The display 12 can show the temperature differential selected by the operator when the operator uses the temperature control section 16. The control panel 20 may also include a battery indicator 18 that indicates the amount of available power in the rechargeable battery 10. The mobile heated cabinet 1 may include a plurality of control panels for each food storage area 2. Alternately, the control panel 20 can include dials, switches, and the like known to those skilled in the art for effecting the noted controls and adjustments. For example, rotatably mounted control dials mounted on the control panel 20 and movable in a push-and-turn fashion to any user-selected positions can permit an operator to input the desired operating parameters into the mobile heated cabinet 1. The control panel 20 may also include associated indicator lights (not shown) to inform an operator of the status of a particular food storage area 2, such as whether the temperature in the food storage area 2 is increasing, decreasing, or at a desired temperature.

The fan 7, temperature sensors 8, controller 6, and control panel 20 receive power from the external source of electrical power when the power cord 22 is plugged in. When the power cord 22 is disconnected from the external source of electrical power, the fan 7, temperature sensors 8, controller 6, and control panel 20 will automatically receive electric power from the rechargeable battery 10 in response to triggering of a change-over switch or similar electronic device (not shown).

The rechargeable battery 10 is disposed outside of the food storage area 2 and as seen in FIG. 1, is mounted on the top wall 9 of the cabinet 1. Typically, the cabinet will be disconnected from the external power source when it is to be moved from its stationary location, such as in a kitchen, to another location, such as one near where the food is to be served. The rechargeable battery 10 is arranged to be charged when the external source of electrical power is plugged in through the power cord 22.

Accordingly, the mobile heated cabinet 1 is capable of powering the fan with the rechargeable battery 10 to continue to circulate the air and keep the temperature substantially uniform throughout the interior of the cabinet 1, thereby helping to maintain food temperature uniformity for both safety and quality reasons. While the mobile heated cabinet 1 is being powered by the rechargeable battery 10, temperature monitoring is possible through use of the one or more temperature sensors 8.

Figure 4:
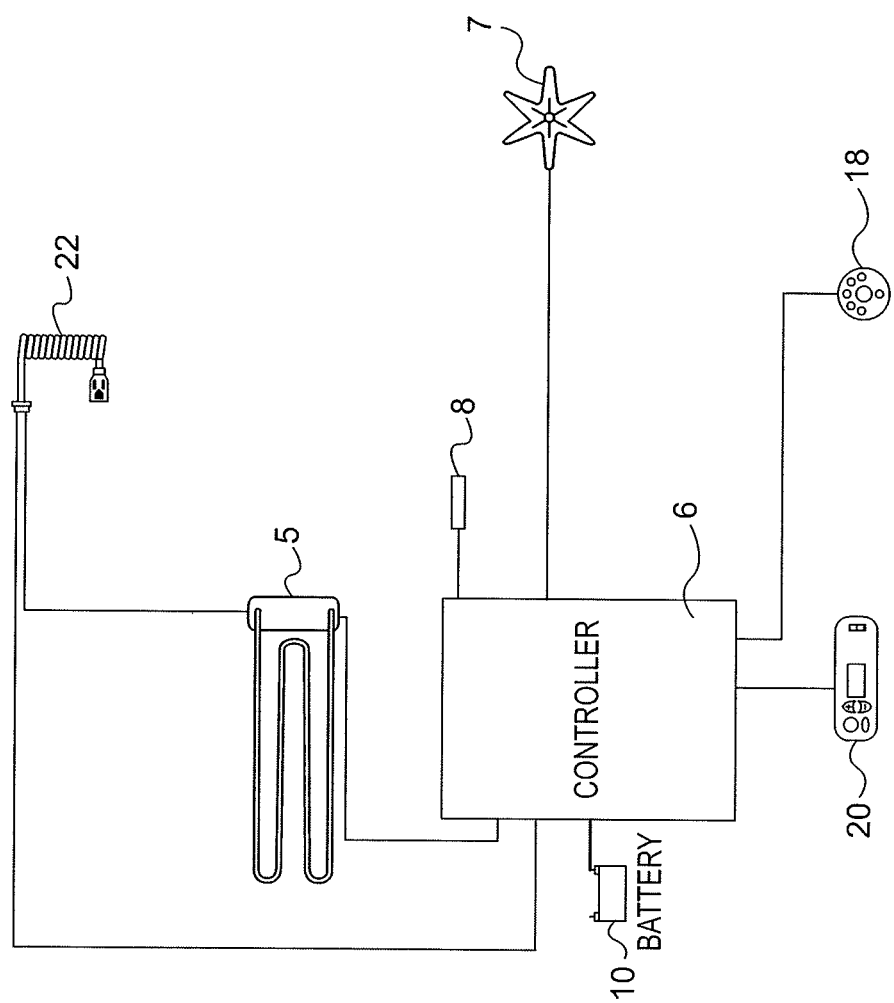
FIG. 4 is an exemplary electrical diagram of the components for controlling the heating of the mobile heated cabinet of FIG. 1.

FIG. 4 illustrates an exemplary electrical diagram of the various electrical components for controlling the heating of the mobile heated cabinet of the present invention. The electrical diagram of FIG. 4 displays an embodiment for electrically connecting the heating element 5, the controller 6, the fan 7, one of temperature sensors 8, the rechargeable battery 10, the battery indicator 18, the control panel 20, and the power cord 22 to one another. The electrical diagram of FIG. 4 represents an exemplary embodiment for connecting the various components within the mobile heated cabinet of the present invention, however, it is to be understood that the invention is not limited to this precise embodiment, and that various other changes and modifications may be affected therein by one skilled in the art without departing from the scope or spirit of the invention.

In another embodiment, the controller 6 may include a timer that cycles operation of the fan to conserve the battery. The timer can be set to run the fan 7 for predetermined intermittent periods of time by use of the control panel 20. The fan 7 may continuously operate when the cabinet 1 is plugged in to the external power source, and may operate for predetermined cyclical amounts of time when the cabinet 1 is not connected to the external source of electrical power but is operated under battery power.

In yet another embodiment, the controller 6 may operate to power the fan 7 when the temperature sensors 8 indicate a specified temperature differential between selected locations in the interior of the cabinet. The specified temperature can be set by use of the control panel 20. The fan 7 will continuously operate when the mobile heated cabinet 1 is plugged in. When the mobile heated cabinet is not connected to the external source of electrical power, the controller 6 may be arranged such that the fan 7 will start when the specified temperature is reached.

In still another embodiment, the controller 6 may operate to power the fan 7 intermittently when the mobile heated cabinet 1 is not connected to the external source of electrical power. Again, this function could extend the duration of function of the fan for a given battery capacity.

In another embodiment, the controller 6 may also operate as a logging unit that logs status information. The controller 6 may record status information that includes: the mobile heated cabinet's model number and serial number, time and/or date information, a power state of the mobile heated cabinet, the preferred temperature scale of the mobile heated cabinet (° F. or ° C.), whether the mobile heated cabinet has finished preheating, a preferred temperature of the mobile heated cabinet, an actual temperature of the mobile heated cabinet, a low temperature set point to turn on the air circulating device, and whether the mobile heated cabinet is at or below the low temperature set point.

While the present invention has been described with a mobile heated cabinet in mind, the present invention is not limited to such or to food service applications, but could be used for other types of containers, in commercial or non-commercial settings. The invention may also be modified to accommodate non-food service applications.

The foregoing provides a mobile heated cabinet and method that can mitigate stratification of temperatures within the cabinet by circulating heated air in the cabinet whether or not the mobile heated cabinet is connected to or disconnected from an external power source.

One of ordinary skill in the art will realize that modifications and variations, including but not limited to those discussed above, are possible within the spirit and scope of the present invention. The invention is intended to be limited in scope only by the accompanying claims, which should be accorded the broadest interpretation so as to encompass all such modifications, equivalent structures and functions.

What is claimed is:

1. A method of mitigating stratification of temperature within the interior of a mobile heated cabinet used to both (a) store food at a stationary location and (b) store and transport food when moved from the stationary location, said method including steps of:
   providing an electric-powered heating device that heats the interior of the cabinet;
   providing, an electric-powered an circulating device that circulates air in the interior of the cabinet;
   providing a connection for receiving, from an external source, electrical power for the heating device and the air circulating device, for use when the cabinet is performing the storing function at a stationary location;
   providing a self-contained source of electrical power associated with the cabinet for powering the air circulating device when the cabinet is performing the storing and transporting function;
   providing a switching mechanism for automatically switching between a first mode, in which the air circulating device draws electrical power from the connection for receiving electrical power from the external source, to a second mode, in which the air circulating device draws power from the self-contained source of electrical power;
   (a) when the cabinet is connected to the external power source in the first mode, powering both the heating device and air circulating device with the external power source, to thereby mitigate stratification of temperatures within the cabinet by mitigating accumulation of heated air at the top of the interior of the cabinet; and
   (b) when the cabinet is disconnected from the external power source, automatically switching, using the switching mechanism, from the first mode to the second mode, without powering the heating device, to thereby mitigate stratification of temperatures within the cabinet by mitigating accumulation of heated air at the top of the interior of the cabinet when performing the storing and transporting function.

2. The method according to claim 1, further comprising the steps of:
   providing a plurality of temperature sensors in the interior of the cabinet, at different positions, for measuring a temperature differential between the sensors;
   powering the temperature sensors with the external power source when in the first mode; and
   automatically powering the temperature sensor with the self-contained source of electrical power in the second mode.

3. The method according to claim 2, further comprising the steps of:
   providing a display to the exterior of the cabinet for displaying a temperature differential measured by the polarity of temperature sensors;
   powering the display with the external power source when in the first mode; and
   automatically powering the display with the self-contained source of electrical power when the cabinet is disconnected from the external power source in the second mode.

4. The method according to claim 1, further comprising the steps of:
   providing a logging unit to the exterior of the cabinet for logging status information of the cabinet;
   powering the logging unit with the external power source when in the first mode;
   automatically powering the logging unit display with the self-contained source of electrical power when the cabinet is disconnected from the external power source in the second mode.

5. The method according to claim 1, wherein the cabinet further comprise a timer that cycles operation of the air circulating device between operation and non-operation for predetermined periods when in the second mode.

6. The method according to claim 1, wherein the air circulating device is automatically powered intermittently when in the second mode.

7. A method of mitigating stratification of temperature within the interior of a mobile heated cabinet used to both (a) store food at a stationary location and (b) store and transport food when moved from the stationary location, said method including the steps of:
   providing an electric-powered heating device that heats the interior of the cabinet;
   providing an electric-powered air circulating device that circulates air in the interior of the cabinet;
   providing a polarity of temperature sensors in the interior of the cabinet;
   providing a connection for, from an external source, receiving electrical power for the heating device, the air circulating device, and the temperature sensors, for use when the cabinet is preforming the storing function at a stationary location;
   providing a self-contained source of electrical power associated with the cabinet for powering the air circulating device and the temperature sensors for use when the cabinet is performing the storing and transporting function;

providing a switching mechanism for automatically switching between a first mode, in which the air circulating device and temperature sensors draw electrical power from the connection for receiving electrical power from the external source, to a second mode, in which the air circulating device and temperature sensors draw power from the self-contained source of electrical power;

when the cabinet is connected to the external power source, in the first mode, powering both the heating device and air circulating device with the external power source, to thereby mitigate stratification of temperatures within the cabinet by mitigating accumulation of heated air at the top of the interior of the cabinet;

measuring a temperature differential with the temperature sensors within the interior of the cabinet; and when the cabinet is disconnected from the external power source, automatically switching, using the switching mechanism, from the first mode to the second mode to power the air circulating device and temperature sensors, without powering the heating device, and when a specified temperature differential is measured in said step of measuring the temperature differential, automatically operating the air circulating device with the self-contained power source, to thereby mitigate stratification of temperatures within the cabinet by mitigating accumulation of heated air at the top of the interior of the cabinet.

\* \* \* \* \*